(12) United States Patent
Gacanin et al.

(10) Patent No.: US 10,455,458 B2
(45) Date of Patent: Oct. 22, 2019

(54) CONTROL METHOD AND CONTROL SYSTEM FOR CONTROLLING ACCESS POINTS IN A WIRELESS NETWORK

(71) Applicant: Alcatel Lucent, Nozay (FR)

(72) Inventors: Haris Gacanin, Antwerp (BE); Soheil Rostami, Antwerp (BE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/320,251

(22) PCT Filed: Jul. 25, 2017

(86) PCT No.: PCT/EP2017/068703
§ 371 (c)(1),
(2) Date: Jan. 24, 2019

(87) PCT Pub. No.: WO2018/024535
PCT Pub. Date: Feb. 8, 2018

(65) Prior Publication Data
US 2019/0239124 A1    Aug. 1, 2019

(30) Foreign Application Priority Data

Aug. 1, 2016 (EP) .................................. 16305995

(51) Int. Cl.
*H04W 28/00* (2009.01)
*H04W 28/26* (2009.01)
(Continued)

(52) U.S. Cl.
CPC ......... *H04W 28/26* (2013.01); *H04W 52/243* (2013.01); *H04W 52/343* (2013.01); *H04W 84/12* (2013.01)

(58) Field of Classification Search
CPC . H04W 28/26; H04W 52/243; H04W 52/343; H04W 84/12
See application file for complete search history.

(56) References Cited

U.S. PATENT DOCUMENTS

2006/0025150 A1    2/2006  Kim et al.
2006/0046737 A1*   3/2006  Douglas ................ H04W 16/18
                                                            455/452.2
(Continued)

FOREIGN PATENT DOCUMENTS

EP    3048846 A1     7/2016
JP    6450260 B2 *   1/2019

OTHER PUBLICATIONS

International Search Report PCT/ISA/210 for PCT International Application PCT/EP2017/068703 dated Oct. 26, 2017.
(Continued)

*Primary Examiner* — Khai M Nguyen
(74) *Attorney, Agent, or Firm* — Harness, Dickey & Pierce, P.L.C.

(57) ABSTRACT

A control method includes obtaining from each access point of a plurality of access points at least one traffic parameter, the at least one traffic parameter being representative for a traffic load of the respective access point; identifying from the plurality of access points a target access point having a highest traffic load, based on said obtained at least one traffic parameter; defining for each access point of the plurality of access points a corresponding interference threshold; setting a transmit power of the target access point to a target transmit power and assigning to the target access point a target communication channel from among a plurality of communication channels, such that an interference at any one access point of the plurality of access points is lower than the corresponding interference threshold of the any one access point.

15 Claims, 3 Drawing Sheets

(51) Int. Cl.
*H04W 52/24* (2009.01)
*H04W 52/34* (2009.01)
*H04W 84/12* (2009.01)

(56) References Cited

U.S. PATENT DOCUMENTS

| | | | |
|---|---|---|---|
| 2011/0051677 A1* | 3/2011 | Jetcheva | H04W 72/0486 370/329 |
| 2011/0170437 A1 | 7/2011 | Zhou et al. | |
| 2012/0224481 A1* | 9/2012 | Babiarz | H04L 43/0876 370/230.1 |
| 2012/0224484 A1* | 9/2012 | Babiarz | H04L 41/5019 370/235 |
| 2013/0272285 A1* | 10/2013 | Goldsmith | H04W 24/02 370/338 |
| 2015/0045076 A1 | 2/2015 | Pan et al. | |
| 2015/0208426 A1 | 7/2015 | Jetcheva et al. | |
| 2018/0027502 A1* | 1/2018 | Gacanin | H04W 24/02 370/252 |
| 2019/0124525 A1* | 4/2019 | Gacanin | H04L 41/14 |

OTHER PUBLICATIONS

Demirci, et al., "Gap-free load balancing algorithims in wireless LANs using cell breathing technique", Department of Computer Engineering, Marmara University, pp. 1-6, Feb. 5, 2019.

Esam et al., "Cooperative game strategy for IEEE 802.11s mesh WLAN power management", IEEE, pp. 1-5, Feb. 5, 2019.

* cited by examiner

CONTROL METHOD AND CONTROL SYSTEM FOR CONTROLLING ACCESS POINTS IN A WIRELESS NETWORK

CROSS-REFERENCE TO RELATED APPLICATIONS

This application is a national phase under 35 U.S.C. § 371 of PCT International Application No. PCT/EP2017/068703 which has an international filing date of Jul. 25, 2017, which claims priority to European Application No. 16305995.9, filed Aug. 1, 2016, the entire contents of each of which are hereby incorporated by reference.

FIELD OF INVENTION

The field of the invention relates to wireless networks. Particular embodiments relate to a control method and control system for controlling access points in a wireless network.

BACKGROUND

Radio Resource Management (RMM) is concerned with controlling co-channel interference (CCI), radio resources, and other radio transmission related characteristics in wireless networks, such as Wireless Local Area Networks (WLANs).

In high-density infrastructure based wireless networks, for example a 802.11 WLAN, RMM has been identified as a pivotal element to improve overall user experience within the WLAN. However, RMM is a challenging task, especially in the context of unplanned deployments with multiple interfering neighboring Access Points (APs).

Employing an efficient RRM is of importance for minimizing CCI, which is one of the most significant causes of poor performance, coverage and capacity in WLANs.

SUMMARY

The object of embodiments of the invention is to provide a control method and a control system for controlling access points in a wireless network such that CCI within the wireless network is lowered and coverage within the wireless network is improved. Embodiments of the invention aim to provide a control method and control system which lower CCI in the wireless network and improve capacity while maintaining fairness with regard to the quality of experience for all users in the wireless network, across different access points.

According to a first aspect of the invention there is provided a control method for controlling a plurality of access points in a wireless network wherein the plurality of access points are operable on a plurality of communication channels. The control method comprises the steps of:
  obtaining from each access point of the plurality of access points at least one traffic parameter, the at least one traffic parameter being representative for a traffic load of the respective access point;
  identifying from said plurality of access points a target access point having a highest traffic load, based on said obtained at least one traffic parameter;
  defining for each access point of the plurality of access points a corresponding interference threshold; and
  setting a transmit power of the target access point to a target transmit power and assigning to the target access point a target communication channel from among the plurality of communication channels, such that an interference at any one access point of the plurality of access points is lower than the corresponding interference threshold of said any one access point.

Embodiments of the invention are based inter alia on the insight that by identifying the target access point having the highest traffic load from the plurality of access points, this target access point can be prioritized within the wireless network as compared to access points having lower traffic loads. By setting the transmit power of the target access point to a target transmit power and by assigning to the target access point a target communication channel overall CCI in the wireless network can be reduced and coverage of the wireless network can be improved. Moreover, by prioritizing setting a target transmit power and assigning a target communication channel of the target access point having the highest traffic load and thus potentially the highest number of users connected to the access point, the wireless network can be controlled in a fair manner in that a quality of experience of users is improved in an efficient manner. In addition, by setting a transmit power of the target access point to a target transmit power and assigning to the target access point a target communication channel from among the plurality of communication channels, such that an interference at any one access point of the plurality of access points is lower than the corresponding interference threshold of said any one access point, the target access point can be controlled, without causing an interference violation at other access points of the wireless network. Furthermore, by obtaining from each access point of the plurality of access points at least one traffic parameter, the at least one traffic parameter being representative for a traffic load of the respective access point, the control method can be carried out without any interaction with user devices which might be connected to any one of the plurality of access points in the wireless network.

According to a preferred embodiment, setting the transmit power of the target access point to a target transmit power comprises determining a maximum transmit power for each communication channel of the plurality of communication channels, such that the interference at any one access point of the plurality of access points is lower than the corresponding interference threshold of said any one access point.

By determining a maximum transmit power to be set as the transmit power of the target access point, a coverage of the target access point may be enlarged along with a capacity of the target access point, and a quality of experience of users connected to the target access point may be improved. Because the target access point has the highest traffic load as compared to other access points in the wireless network, maximizing the transmit power of the target access point, while keeping the interference at any one access point of the plurality of access points lower than the corresponding interference threshold of said any one access point will have a beneficial effect on the overall quality of experience of users within the wireless network.

According to a preferred embodiment, assigning the target communication channel comprises assigning a communication channel for which the determined maximum transmit power is highest.

Maximum transmit powers of access points may vary from one channel to another. By assigning to the target access point the communication channel for which the determined maximum transmit power is highest, the capacity and coverage of the target access point can be optimized.

According to a preferred embodiment, assigning the target communication channel comprises assigning a communication channel on which a sensed interference by the target access point is lowest.

When for example the determined maximum transmit power on a first communication channel is equal to the determined maximum transmit power on a second communication channel, assigning from the first and second communication channel as a target communication channel the communication channel on which a sensed interference by the target access point is lowest, leads to a preferred target transmit power and target communication channel for the target access point, while keeping the interference at any other access point of the plurality of access points at an acceptable level.

According to a preferred embodiment, defining for each access point of the plurality of access points a corresponding interference threshold comprises defining the corresponding interference threshold based on the traffic load of the respective access point.

By determining for each access point the corresponding interference threshold based on the traffic load of the respective access point, a fair management of interference levels may be reached. For example, determining for an access point with a high traffic load a low interference threshold may be more beneficial for overall quality of experience of users in the wireless network as compared to determining for an access point with a low traffic load a low interference threshold. An amount of traffic load that is managed by an access point is a fair variable to determine an acceptable level of interference for said access point.

According to a preferred embodiment, the control method comprises estimating the interference at said any one access point based on at least one of a path loss and a received signal strength indicator at said any one access point.

According to a preferred embodiment, the steps of identifying an access point having a highest traffic load, defining for each access point of the plurality of access points a corresponding interference threshold, setting a transmit power of the target access point to a target transmit power and assigning to the target access point a target communication channel are executed iteratively at least until a target transmit power has been set for, and a target communication channel has been assigned to each access point of the plurality of access points.

When the steps of identifying the access point having a highest traffic load, defining for each access point of the plurality of access points a corresponding interference threshold, setting a transmit power of the target access point to a target transmit power and assigning to the target access point a target communication channel have all been carried out, these steps can be repeated for the remaining access points of the plurality of access point in the wireless network. During a first iteration of the above described steps the access point with the highest traffic load was selected to be the target access point, during a second iteration of the above described steps the access point with the second highest traffic load can be selected to be the target access point, etc.

The skilled person will understand that the hereinabove described technical considerations and advantages for device embodiments also apply to the below described corresponding method embodiments, mutatis mutandis.

According to a second aspect of the invention there is provided a control system for controlling a wireless network comprising a plurality of access points being operable on a plurality of communication channels. The control system comprises:

an obtaining unit for obtaining from each access point of the plurality of access points at least one traffic parameter, the at least one traffic parameter being representative for a traffic load of the respective access point;

an identifying unit for identifying from said plurality of access points a target access point having a highest traffic load, based on said obtained at least one traffic parameter;

a threshold defining unit for defining for each access point of the plurality of access points a corresponding interference threshold;

a transmit power setting unit for determining a target transmit power and setting a transmit power of the target access point to the target transmit power; and a communication channel assigning unit for determining a target communication channel and assigning to the target access point the target communication channel from among the plurality of communication channels. The target transmit power and target communication channel are determined such that an interference sensed by any one access point of the plurality of access points is lower than the corresponding interference threshold of said any one access point.

According to a preferred embodiment, the transmit power setting unit is configured for determining a maximum transmit power for each communication channel of the plurality of communication channels such that the interference at any one access point of the plurality of access points is lower than the corresponding interference threshold of said any one access point.

According to a preferred embodiment, the communication channel assigning unit is configured for determining the target communication channel to be a communication channel for which the determined maximum transmit power is highest.

According to a preferred embodiment, the communication channel assigning unit is configured for determining the target communication channel to be a communication channel on which a sensed interference by the target access point is lowest.

According to a preferred embodiment, the threshold defining unit is configured for defining the corresponding interference threshold based on the traffic load of the respective access point.

According to a preferred embodiment, the control system comprises an interference estimating unit for estimating the interference at said any one access point based on at least one of a path loss and a received signal strength indicator at said any one access point.

According to a preferred embodiment, the at least one traffic parameter comprises an amount of received and sent packets of the respective access point.

According to a further aspect of the invention, there is provided a computer program comprising computer-executable instructions to perform the method, when the program is run on a computer, according to any one of the steps of any one of the method embodiments disclosed above.

According to a further aspect of the invention, there is provided a computer device or other hardware device programmed to perform one or more steps of any one of the embodiments of the method disclosed above.

According to another aspect there is provided a data storage device encoding a program in machine-readable and machine-executable form to perform one or more steps of any one of the embodiments of the method disclosed above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
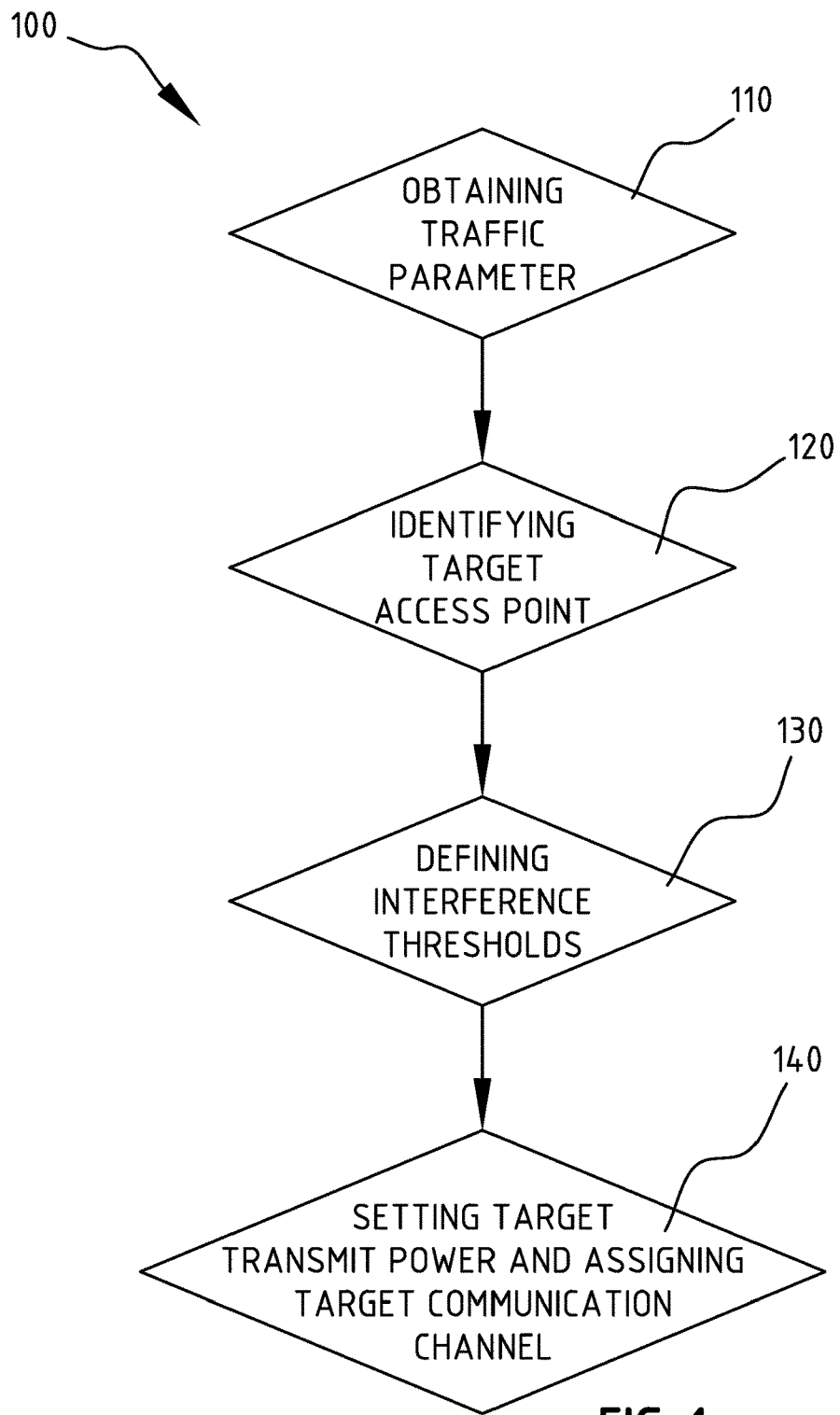
FIG. 1 illustrates schematically an embodiment of a control method for controlling a plurality of access points in a wireless network according to the invention.
Figure 3:
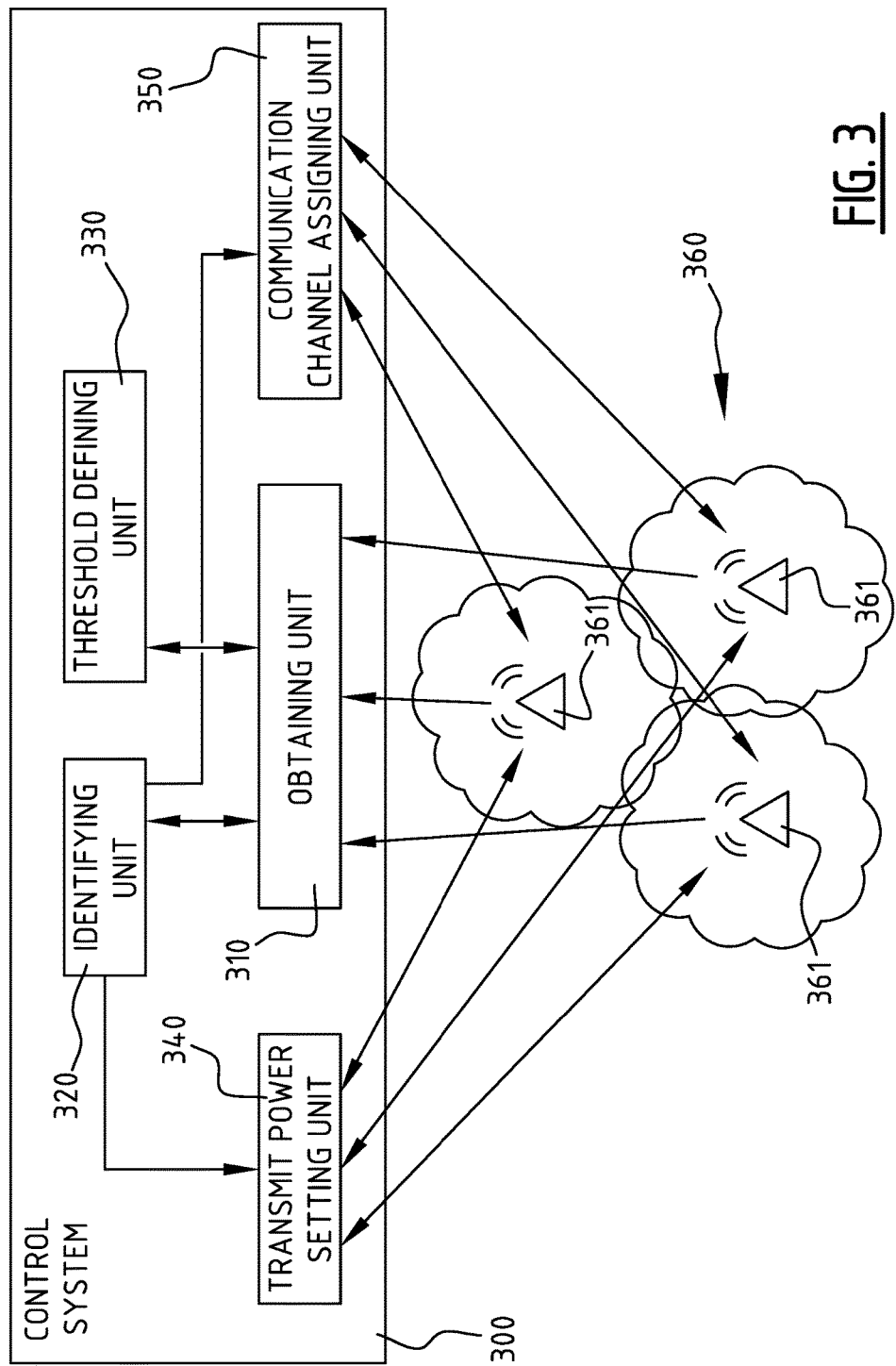
FIG. 3 illustrates an embodiment of a control system for controlling a plurality of access points in a wireless network according to the invention.

FIG. 1 illustrates a control method 100 for controlling a plurality of access points in a wireless network wherein the plurality of access points are operable on a plurality of communication channels. It is assumed that the wireless network is a WLAN comprising J access points (APs), represented by $AP_j$, $j \in \{1, \ldots, J\}$ which are competing for H non-overlapping communication channels wherein $h \in \{1, \ldots, H\}$. In addition it is assumed that the WLAN is centrally controllable or manageable by a control system 300, as illustrated in FIG. 3, or management center, respectively, wherein the control system 300 or management center can control all APs 361, for example via TR181.

The control method comprises a first step 110 obtaining from each access point 361 of the plurality of access points at least one traffic parameter, the at least one traffic parameter being representative for a traffic load of the respective access point. The at least one traffic parameter may comprise an amount of received and sent packets of the respective access point. Based on the obtained traffic parameter, the second step 120 of identifying from said plurality of access points a target access point having a highest traffic load can be performed. Each $AP_j$ can be prioritized based on their traffic ratio $T_j$, $j \in \{1, \ldots, J\}$, which is representative for a traffic load of $AP_j$, wherein the traffic ratio can be calculated as $$T_j = \frac{L_j}{\sum_{i=1}^{J} L_i}$$

$j \in \{1, \ldots, J\}$, wherein $L_j$, $j \in \{1, \ldots, J\}$ represents a summation of sent and received packets in $AP_j$. Based hereon, the AP with highest traffic ratio can be selected as $AP_i = \arg\max T_i$, wherein $AP_i$ is identified as the target access point.

In step 140 a target transmit power will be set for the target access point and a target communication channel will be assigned to the target access point, without causing an interference violation to other APs on any of the available communication channels.

In order to do this, first one has to perform step 130 of defining for each access point of the plurality of access points a corresponding interference threshold, such that step 140 can be performed such that an interference at any one access point of the plurality of access points is lower than the corresponding interference threshold of said any one access point.

Interference at any one AP can be determined or calculated in different ways. For example, from a respective AP the corresponding RSSI can be collected at any moment, which is representative for an interference experienced at the respective AP. Another way to calculate an interference experienced by a particular $AP_k$ will be described below.

In the assumption that the locations of the APs in a WLAN are static for a period of time, pathlosses between APs on each of the available communication channels are fixed for that same period of time. Therefore, pathlosses between any arbitrary pair of APs on each of the available communication channels can be calculated during network initialization or network deployment, as follows.

A pathloss from $AP_j$ to $AP_k$ over a channel $CH_h$ can be represented as $Pl_{j,k}^{h}$. Moreover, pathlosses can be calculated between APs by differentiating transmit power and monitoring RSSI between APs as: $Pl_{j,k}^{h} = P_j^{h\_TEST} - RSSI_{j,k}^{h\_TEST}$, wherein $P_j^{h\_TEST}$ represents a transmit power of $AP_j$ over channel $CH_h$ during network initialization and $RSSI_{j,k}^{h\_TEST}$ represents the RSSI at $AP_k$ received from $AP_j$ transmitting on $CH_h$ with transmit power $P_j^{h\_TEST}$. As mentioned earlier, when the pathlosses between APs on different communications channels are calculated during network initialization or network deployment, they are assumed to stay fixed for a period of time, and they can be used to quickly estimate RSSIs without the need of retrieving RSSI parameters from the respective AP. Moreover, RSSI of $AP_j$ at $AP_k$ over $CH_h$ can be estimated as $RSSI_{j,k}^{h} = P_j^{h} - Pl_{j,k}^{h}$. Furthermore, and more into detail an overall CCI sensed by $AP_k$ on $CH_h$ can be calculated as $$I_k^h = \sum_j 10^{\left(\frac{RSSI_{j,k}^h}{10}\right)} + N_k^h \text{(watts)} (k \neq j).$$

In this formula $N_k^h$ is the total neighbors interference on $CH_h$ at $AP_k$, which is a part of interference that originates from other sources than the APs in the wireless network. The total neighbors interference can for example be captured by a device carrier sensing mechanism and reported to the control system which overlooks the wireless network. The total neighbors interference is energy which can be detected at radio level on a particular communication channel from IEEE or non-IEEE sources. Depending on the requirements and preferences of a specific WLAN $N_k^h$ can be taken into account or can be neglected when calculating CCI.

Interference at an AP can be calculated or estimated as described above. Depending on the specific type, set-up and requirements of the wireless network, an interference threshold can be defined. Preferably, defining for each access point of the plurality of access points a corresponding interference threshold in step 130 comprises defining the corresponding interference threshold based on the traffic load of the respective access point. For example, an interference threshold $Tr_j$ can be defined as being dependent on a traffic load or traffic ratio $T_j$ of $AP_j$: $Tr_j = T_j I$, $j \in \{1, \ldots, J\}$, wherein I is the interference threshold level if $T_j = 1$. Herein, I can be determined in a similar way as can be done in cognitive radio networks. As will be elaborated on below, assuming a worst case scenario where interfering APs are located extremely close to a receiving AP. The receiving AP can only detect an RF signal if its received power is greater than a received sensitivity. Furthermore the receiving AP can only extract error-less stream if its received SNR is greater than a minimum acceptable SNR according to the standard, being −91 dbm-81 dbm corresponding to lowest data rate). The specific approach to determine/depends on chip set's sensitivity which may have different values. For example with a sensitivity of −110 dBm, the acceptable interference in the entire WLAN, regardless of the amount of APs, can be estimated as: I≤−110 dBm+91 dBm=−19 dBm.

Preferably in step 140, setting the transmit power of the target access point, to a target transmit power comprises determining a maximum transmit power for each communication channel of the plurality of communication channels, such that the interference at any one access point of the plurality of access points is lower than the corresponding interference threshold of said any one access point. Moreover in step 140, assigning the target communication channel may comprise assigning a communication channel for which the determined maximum transmit power is highest.

In other words transmit power $P_i^h$, with i being the index of the target access point, is set to a maximum possible over all available communication channels $CH_h$, $h \in \{1, \ldots, H\}$, provided that $Tr_j \geq \Sigma k \neq j\ I_k^h$, $j \in \{1, \ldots, J\}$, $h \in \{1, \ldots, H\}$. Each AP may have different power levels that can be achieved, based on the specify type or model of the AP.

As a result of the above described method steps, a set of $(CH_h, P_i^h, I_i^h)$ for $h \in \{1, \ldots, H\}$ is obtained. In other words, for every communication channel available to the target access point $AP_i$, a maximum transmit power $P_i^h$ is determined and a corresponding interference $I_i^h$ is calculated.

Figure 2:
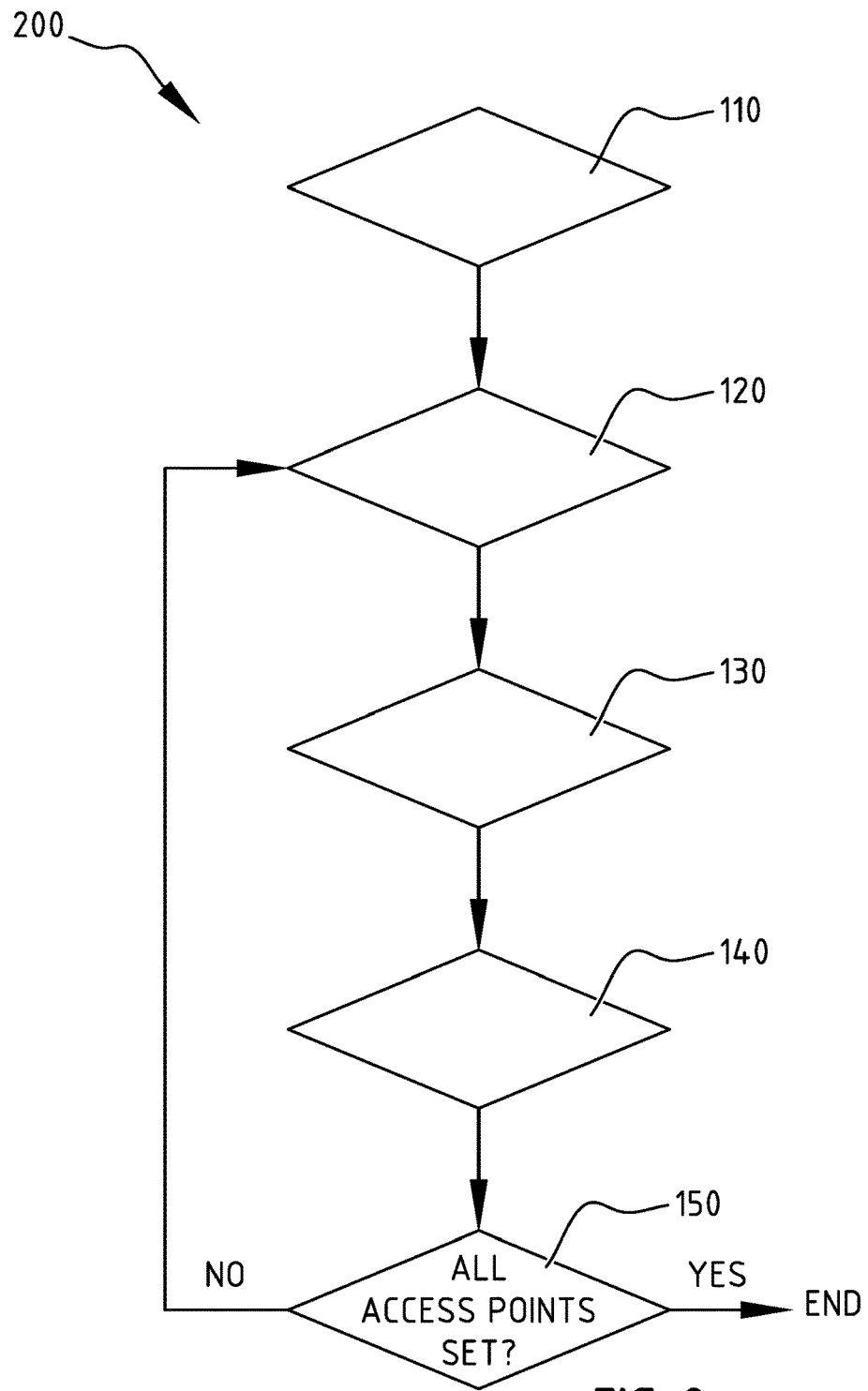
FIG. 2 illustrates schematically a further embodiment of a control method for controlling a plurality of access points in a wireless network according to the invention.

From this set, the target transmit power and target communication channel for the target access point can be determined. Preferably, the target transmit power and target communication channel for the target access point $AP_i$ are determined by assigning as target communication channel the channel $CH_h$ with highest transmit power $P_i^h$: $CH_h$=arg max $P_j^h$ Alternatively, or In the event that different communication channels have identical $P_j^h$, the communication channel which has the least interference can be assigned: $CH_h$=arg min $I_i^h$ FIG. 2 illustrates an embodiment of the control method 200 according to the invention, which is similar to the method of FIG. 1 with the difference that in the method of FIG. 2, steps 120, 130 and 140 are repeated until no access points in the wireless network remain without an allocation of a transmit power and communication channel. To accomplish this, the control method 200 of FIG. 2 further comprises a step 150 in which is checked whether all access points in the wireless network have been assigned a transmit power and communication channel.

FIG. 3 illustrates a control system 300 for controlling a wireless network 360 comprising a plurality of access points 361 being operable on a plurality of communication channels. The control system 300, may be configured to perform the steps of the control methods of FIG. 1 and FIG. 2 in accordance with the above given description in view of FIG. 1 and FIG. 2. The control system 300 comprises:

an obtaining unit 310 for obtaining from each access point 361 of the plurality of access points at least one traffic parameter, the at least one traffic parameter being representative for a traffic load of the respective access point 361;

an identifying unit 320 for identifying from said plurality of access points a target access point having a highest traffic load, based on said obtained at least one traffic parameter;

a threshold defining unit 330 for defining for each access point of the plurality of access points a corresponding interference threshold;

a transmit power setting unit 340 for determining a target transmit power and setting a transmit power of the target access point to the target transmit power; and a communication channel assigning unit 350 for determining a target communication channel and assigning to the target access point the target communication channel from among the plurality of communication channels. The target transmit power and target communication channel are determined such that an interference sensed by any one access point 361 of the plurality of access points is lower than the corresponding interference threshold of said any one access point.

Although the above described control method and control system can be applied to any wireless network, the control method and control system according to the invention are particularly suited for controlling access points in high-density WLANs.

According to preferred embodiment, the control method assigns maximum power and any one of non-overlapping channels to each AP in WLAN, jointly with the objective of minimizing CCI to other AP in the WLAN based on their traffic load. The described method not only minimizes overall CCI in the WLAN but also improves the capacity thereof by selecting higher transmission power for APs in the WLAN. Traffic load of each AP is taken into consideration to maintain fairness in the quality of experience across all user devices connected to different APs in the WLAN. This is done by assigning higher transmit power to the target access point and reducing the CCI that user devices of the target access point may experience. Due to absence of sophisticated mechanisms to mitigate the interference on the family of IEEE 802.11, RRM is highly dampened; and that is main reason for introducing a semi-persistent method that can be conducted for example every 15-20 minutes in a periodic manner.

To cope with extensive CCI in already deployed WLAN, embodiments of the invention exploit two degrees of freedom; maximum transmit power allocation and assigning any one of non-overlapping channels to each AP. Ignoring one of them may degrade quality of experience of users significantly, especially in the case of high-density WLAN due to the limited number of available non-overlapping channels.

Prior art control methods not only seem to ignore joint channel and maximum power allocation to APs, but also do not consider a traffic load of APs in the wireless network, which leads to an unfair channel assignment. On the contrary, embodiments of the invention prioritize APs based on for example their average load by assigning a higher transmit power level to highly-loaded APs as well as protecting them against interference of other less-loaded APs by reducing its interference threshold.

The proposed control method and control system limit the overall interference in wireless networks, more particularly in ultra-dense WLANs. This is achieved by assigning a higher transmit power to APs with a higher traffic load and allowing APs with higher traffic load to cause a higher amount of interference to APs with a lower traffic load within the WLAN, wherein the APs with higher traffic load will receive less interference from other APs within the WLAN.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labelled as "processors", "units" or "modules", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "unit" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. Control method for controlling a plurality of access points in a wireless network wherein the plurality of access points are operable on a plurality of communication channels, the control method comprising:
obtaining from each access point of the plurality of access points at least one traffic parameter, the at least one traffic parameter being representative for a traffic load of the respective access point;
identifying from said plurality of access points a target access point having a highest traffic load, based on said obtained at least one traffic parameter;
defining for each access point of the plurality of access points a corresponding interference threshold;
setting a transmit power of the target access point to a target transmit power and assigning to the target access point a target communication channel from among the plurality of communication channels, such that interference at any one access point of the plurality of access points is lower than the corresponding interference threshold of said any one access point.

2. The control method according to claim 1, wherein setting the transmit power of the target access point to a target transmit power comprises determining a maximum transmit power for each communication channel of the plurality of communication channels, such that the interference at any one access point of the plurality of access points is lower than the corresponding interference threshold of said any one access point.

3. The control method according to claim 2, wherein the assigning the target communication channel comprises assigning a communication channel for which the determined maximum transmit power is highest.

4. The control method according to claim 2, wherein the assigning the target communication channel comprises assigning a communication channel on which a sensed interference by the target access point is lowest.

5. The control method according to claim 1, wherein the defining for each access point of the plurality of access points a corresponding interference threshold comprises defining the corresponding interference threshold based on the traffic load of the respective access point.

6. The control method according to claim 1, comprising estimating the interference at said any one access point based on at least one of a path loss and a received signal strength indicator at said any one access point.

7. The control method according to claim 1, wherein the identifying an access point having a highest traffic load, the defining for each access point of the plurality of access points a corresponding interference threshold, the setting a transmit power of the target access point to a target transmit power and the assigning to the target access point a target communication channel are executed iteratively at least until a target transmit power has been set for, and a target communication channel has been assigned to each access point of the plurality of access points.

8. A non-transitory computer-readable medium storing computer-executable instructions which when executed by a computer cause the computer to perform the method of claim 1.

9. Control system for controlling a wireless network comprising a plurality of access points being operable on a plurality of communication channels, the control system comprising:
an obtaining unit for obtaining from each access point of the plurality of access points at least one traffic parameter, the at least one traffic parameter being representative for a traffic load of the respective access point;
an identifying unit for identifying from said plurality of access points a target access point having a highest traffic load, based on said obtained at least one traffic parameter;
a threshold defining unit for defining for each access point of the plurality of access points a corresponding interference threshold;
a transmit power setting unit for determining a target transmit power and setting a transmit power of the target access point to the target transmit power; and
a communication channel assigning unit for determining a target communication channel and assigning to the target access point the target communication channel from among the plurality of communication channels;
wherein the target transmit power and target communication channel are determined such that an interference sensed by any one access point of the plurality of access points is lower than the corresponding interference threshold of said any one access point.

10. The control system according to claim 9, wherein the transmit power setting unit is configured for determining a maximum transmit power for each communication channel of the plurality of communication channels such that the interference at any one access point of the plurality of access points is lower than the corresponding interference threshold of said any one access point.

11. The control system according to claim 10, wherein the communication channel assigning unit is configured for determining the target communication channel to be a communication channel on which a sensed interference by the target access point is lowest.

12. The control system according to claim 9, wherein the communication channel assigning unit is configured for determining the target communication channel to be a communication channel for which the determined maximum transmit power is highest.

13. The control system according to claim 9, wherein the threshold defining unit is configured for defining the corresponding interference threshold based on the traffic load of the respective access point.

14. The control system according to claim 9, further comprising an interference estimating unit for estimating the interference at said any one access point based on at least one of a path loss and a received signal strength indicator at said any one access point.

15. The control system according to claim 9, wherein the at least one traffic parameter comprises an amount of received and sent packets of the respective access point.

* * * * *